Dec. 5, 1944.  H. P. RUF  2,364,476
UNWINDING MACHINE
Filed Dec. 22, 1941
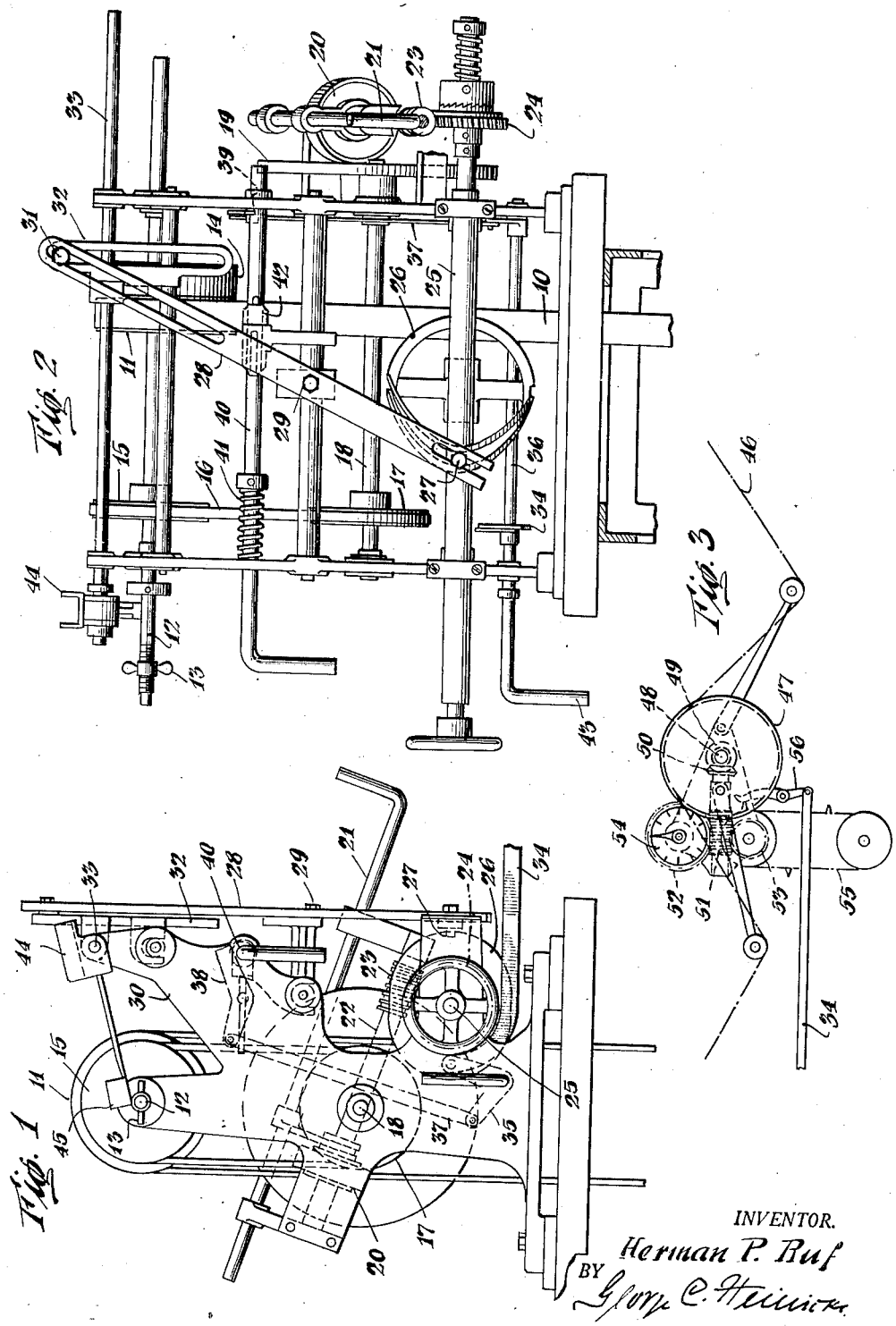
INVENTOR.
Herman P. Ruf
BY George C. Heinicke
ATTORNEY Patented Dec. 5, 1944

2,364,476

UNITED STATES PATENT OFFICE 2,364,476

UNWINDING MACHINE

Herman P. Ruf, New York, N. Y.

Application December 22, 1941, Serial No. 423,977

2 Claims. (Cl. 242—36)

My invention relates to a new and useful spooling and measuring machine for spooling and measuring cords, tapes, ribbons and other materials.

The principal object of my invention is to provide such a machine of simple and comparatively inexpensive design allowing a speedy change for setting up on various lengths of spools and including a traverse feed to suit the various sizes of materials to be spooled.

Another object of my invention is to provide a machine of this character of type equipped with a measuring unit, the dial of which can be selected to measure in feet or yards according to wish and requirement.

Still another object of my invention is the provision of a spooling and measuring machine including a traverse adjustable for spools ranging in suitable sizes as for instance from 2 to 7 inches in length.

A further object of my invention is to provide such a machine equipped with an automatic stop which can be readily set for any yardage required up to 1000 yards.

A still further object of my invention is the provision of a spooling and measuring machine for any suitable kind of material which altho simple in its construction is durable and highly efficient in operation.

These and other objects of my invention will become more fully apparent as the description thereof proceeds and will then be specifically defined in the appended claims.

In the accompanying drawing forming a part of this disclosure;

Fig. 1 is a front elevation of the machine showing the frictional drive mechanism constructed according to my invention.

Fig. 2 is a side elevation thereof.

Fig. 3 is a detail view of the measuring unit.

The machine illustrated is preferably driven from a motor (not shown) by the intermediary of a belt 10 driving a pulley 11 on shaft 12 carrying the spool (not shown) from which the band, cord, or the like is unwound and held in place by means of the wing nut 13 (Fig. 2). The shaft 12 carries next to pulley 11 an idler pulley 14 and also distanced therefrom another pulley 15 over which a belt 16 is guided driving a pulley 17 mounted on a shaft 18 having mounted on its end a friction disc 19 for engagement of a friction wheel 20 adapted to be displaced by means of a rod 21 and is slidably mounted on a shaft 22 (Fig. 1). This shaft carries a worm 23 engaging a worm wheel 24 mounted on a shaft 25 carrying a cam 26 adapted to engage a pin 27 mounted on the lower end of a rocker arm 28 which is pivotally secured, as at 29, to the frame work 30 of the machine while the upper end of the arm 28 is slotted and engaged by a pin 31 of a member 32 fastened to shaft 33 and moves this shaft back and forth by the rocking action of arm 28. The speed of this action is controlled by a friction clutch. A bar 34 (Figs. 1 and 3) is hooked up with a bell crank lever 35 pivoting around shaft 36 and a link 37 connects lever 35 to a bell crank lever 38 which sits in a notch 39 of shaft 40. As soon as the lever 38 comes out of the notch 39 a spring 41 forces the shaft 40 to the right and the bell fork 42 which is mounted on the shaft 40 pushes belt 10 onto the idler pulley 14 and the machine stops. This can also be accomplished by the proper operation of the lever 43 by the intermediary of the bell-crank lever system. Suitable tape guides are indicated at 44 and 45 guiding tape 46. As shown in Fig. 3 the tape 46 is guided over suitable guide rollers to a drum 47 on a shaft 48 journaled in the machine frame. Shaft 48 carries a bevel gear 49 in mesh with another bevel gear 50 driving worm 51 engaging worms 52 and 53 and thus dial 54, and pattern chain 55, the prongs of which engage according to their predetermined arrangement on the chain, the lever 56 to which bar 34 is attached to stop the machine as soon as the desired and measured length of the band has been spooled.

In operation, the spool is located on shaft 12 and belt 10 is on the idler pulley 14. If now shaft 40 is pulled outwardly against the action of its spring 41, the belt is shifted by means of fork 42 onto the driven pulley 11, and when now the motor is started, the shaft 33 slides back and forth, while shaft 12 with the spool rotates. The arm 28 receives a turning movement about its pivot 29 and by means of its pin connection 27 with shaft 25 and according to the adjustment of the friction wheel 20 by means of the arm 21 closer to or farther away from the circumference of the friction disc 19, shaft 25 will receive a faster or slower revolution, and the faster or slower reciprocatory movements of arm 28 will regulate the overlap of the band on the spool so that the band is spooled off faster or slower according to the width of the band. As soon as the desired length of the band is indicated on the dial, the suitably arranged prong of the chain will engage lever 56 and move the same to the right which will move bar 34 to the left, and as the same is connected to the bellcrank lever arrangement will pull lever 37 of this arrangement down and operate lever 38 in the notch 39 of shaft 40 so that the spring 16 of this lever or shaft 40 can push the same and its fork inwardly to shift the belt 10 onto the idler pulley 14 and the operation is at an end.

It will be understood that I have described and shown the preferred form of my machine only as one example of the many possible ways to practically construct the same and that I may make such changes in the construction as come within the scope of the appended claims without departing from the spirit of my invention and the principles involved.

Having thus described my invention, what I claim as new and desire to secure by Letters Patent is:

1. In a machine for spooling material as described, a spool carrying shaft, a driving pulley thereon, and an idler pulley juxtaposed thereto on said shaft, a shaft journaled in the machine frame to which the rotation of the spool carrying shaft is transmitted, a friction disc mounted on said last named shaft, a friction wheel engaging said disc, means to regulate the amount of speed between said disc and wheel, this means including a shaft on which the wheel is slidably mounted and carrying a worm, a worm wheel on a shaft in engagement with said worm, a cam on said last named shaft, a rocker arm pivotally secured intermediate its ends to the machine frame and having in its lower end a slot in which a pin of said cam engages, the upper end of said rocker arm slotted and engaged by a pin of a member fastened to the tape guide bearing shaft to move said shaft back and forth by the rocking action of said rocker arm, a bell-crank lever, a shaft having a notch into which one arm of said bell-crank lever engages to lock the same, a spring on said shaft tending to force the shaft to one side as soon as said lever is disengaged from its notch, and a belt-fork on said shaft pushing the belt on the driving pulley onto the idler pulley to stop the machine, and a means for initiating the stoppage of the machine when a predetermined length of material has been unwound.

2. In an unwinding machine as described, a spool carrying shaft, a driving pulley thereon, and an idler pulley juxtaposed thereto on said shaft, a spring controlled sliding shaft in the machine frame, a belt shifter fork on said shaft to shift the drive belt from said driving pulley onto said idler pulley for stopping the machine, a bell-crank lever, one arm of said lever engaging normally a notch in the end of said sliding shaft, means to disengage said arm from its notch to allow the spring on said sliding shaft to operate said belt shifter to operate the means for initiating the stoppage of the machine when a predetermined length of material has been unwound, and means to regulate the speed of spooling.

HERMAN P. RUF.